US011311867B2

(12) United States Patent
Petrovic

(10) Patent No.: US 11,311,867 B2
(45) Date of Patent: Apr. 26, 2022

(54) COPPER AND IRON CO-EXCHANGED CHABAZITE CATALYST

(71) Applicant: BASF CORPORATION, Florham Park, NJ (US)

(72) Inventor: Ivan Petrovic, Princeton, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/053,111

(22) Filed: Aug. 2, 2018

(65) Prior Publication Data

US 2018/0339288 A1 Nov. 29, 2018

Related U.S. Application Data

(63) Continuation of application No. PCT/IB2017/050545, filed on Feb. 1, 2017.

(60) Provisional application No. 62/290,634, filed on Feb. 3, 2016.

(51) Int. Cl.
| | |
|---|---|
| *B01J 29/76* | (2006.01) |
| *B01J 29/72* | (2006.01) |
| *B01J 35/04* | (2006.01) |
| *B01D 53/94* | (2006.01) |
| *B01J 37/02* | (2006.01) |
| *F01N 3/08* | (2006.01) |
| *B01J 35/10* | (2006.01) |
| *B01J 29/85* | (2006.01) |
| *B01J 37/08* | (2006.01) |
| *B01J 37/30* | (2006.01) |
| *C01B 39/02* | (2006.01) |
| *C01B 39/46* | (2006.01) |
| *F01N 3/10* | (2006.01) |
| *F01N 3/20* | (2006.01) |

(52) U.S. Cl.
CPC ............ *B01J 29/763* (2013.01); *B01D 53/94* (2013.01); *B01D 53/944* (2013.01); *B01D 53/9418* (2013.01); *B01D 53/9477* (2013.01); *B01J 29/723* (2013.01); *B01J 29/85* (2013.01); *B01J 35/04* (2013.01); *B01J 35/10* (2013.01); *B01J 37/0203* (2013.01); *B01J 37/0246* (2013.01); *B01J 37/0248* (2013.01); *B01J 37/08* (2013.01); *B01J 37/30* (2013.01); *C01B 39/026* (2013.01); *C01B 39/46* (2013.01); *F01N 3/08* (2013.01); *F01N 3/106* (2013.01); *F01N 3/2066* (2013.01); *B01D 2251/2062* (2013.01); *B01D 2255/20738* (2013.01); *B01D 2255/20761* (2013.01); *B01D 2255/50* (2013.01); *B01D 2255/9202* (2013.01); *B01D 2255/9205* (2013.01); *B01D 2255/9207* (2013.01); *B01D 2258/012* (2013.01); *B01J 2229/183* (2013.01); *F01N 2610/02* (2013.01)

(58) Field of Classification Search
None
See application file for complete search history.

(56) References Cited

U.S. PATENT DOCUMENTS

| | | | |
|---|---|---|---|
| 5,116,586 A | 5/1992 | Baacke et al. | |
| 7,601,662 B2 | 10/2009 | Bull et al. | |
| 7,645,718 B2 | 1/2010 | Li et al. | |
| 7,998,423 B2* | 8/2011 | Boorse | B01D 53/9418 422/180 |
| 8,293,198 B2 | 10/2012 | Beutel et al. | |
| 8,715,618 B2 | 5/2014 | Trukhan et al. | |
| 8,883,119 B2 | 11/2014 | Bull et al. | |
| 9,302,256 B2* | 4/2016 | Mohanan | B01D 53/94 |
| 9,616,420 B2* | 4/2017 | Chandler | B01J 29/76 |
| 2005/0042151 A1* | 2/2005 | Alward | B01D 39/2082 422/177 |
| 2007/0173404 A1* | 7/2007 | Kureti | B01J 37/0201 502/316 |
| 2010/0251400 A1 | 9/2010 | Boerboom | |
| 2011/0116982 A1* | 5/2011 | Kunieda | C04B 38/0006 422/177 |
| 2011/0165051 A1* | 7/2011 | Beutel | B01D 53/9418 423/239.2 |
| 2014/0112853 A1* | 4/2014 | Mohanan | B01J 29/70 423/213.5 |
| 2014/0193327 A1* | 7/2014 | Casci | C01B 39/04 423/700 |

(Continued)

FOREIGN PATENT DOCUMENTS

| | | |
|---|---|---|
| CN | 102614908 A | 8/2012 |
| CN | 102614910 B | 8/2012 |

(Continued)

OTHER PUBLICATIONS

Zhang, Ranran, Ammonia selective catalytic reduction of NO over Fe/Cu-SSZ-13, Journal, Oct. 10, 2014, Abstract, Issue 94, RSC Advances.
Supplementary European Search Report for counterpart European Application No. EP 17747081, dated Aug. 26, 2019 (3 pages).
PCT International Preliminary Report on Patentability for counterpart International Application No. PCT/IB2017/050545, dated Aug. 7, 2018 (11 pages).
International Search Report for counterpart International Application No. PCT/IB2017/050545, dated May 8, 2017 (2 pages).

*Primary Examiner* — Sheng H Davis
(74) *Attorney, Agent, or Firm* — Vincent Sica

(57) ABSTRACT

The present disclosure generally provides catalysts, catalytic articles and catalyst systems including such catalytic articles. In particular, the catalyst composition includes a zeolite having a chabazite (CHA) crystal structure ion-exchanged with iron and copper. Methods of making and using the catalyst composition are also provided, as well as emission treatment systems containing a catalyst article coated with the catalyst composition. The catalyst article present in such emission treatment systems is useful to catalyze the reduction of nitrogen oxides in gas exhaust in the presence of a reductant.

26 Claims, 4 Drawing Sheets

(56) References Cited

U.S. PATENT DOCUMENTS

2015/0151287 A1* 6/2015 Rivas-Cardona ............................ B01D 53/8628
 423/703
2015/0284255 A1* 10/2015 Maurer ................ B01J 35/1014
 423/714
2015/0290632 A1* 10/2015 Lambert .................. B01J 29/88
 423/705
2015/0352492 A1* 12/2015 Andersen ........... B01D 53/8634
 423/237

FOREIGN PATENT DOCUMENTS

| CN | 104971766 A | 10/2015 |
| JP | 2013-514257 A | 4/2013 |
| JP | 2016-500562 A | 1/2016 |
| WO | WO 2008/118434 A1 | 10/2008 |
| WO | 2008132452 A2 | 11/2008 |
| WO | 2011084218 A2 | 7/2011 |
| WO | 2011125049 A1 | 10/2011 |
| WO | 2012075400 * | 6/2012 |

* cited by examiner

COPPER AND IRON CO-EXCHANGED CHABAZITE CATALYST

CROSS-REFERENCE TO RELATED APPLICATIONS

This application is a continuation of International App. No. PCT/IB2017/050545; filed Feb. 1, 2017, which International Application was published by the International Bureau in English on Aug. 10, 2017, and claims priority to U.S. Provisional Application No. 62/290,634, filed Feb. 3, 2016, each of which is incorporated by reference in their entirety and for all purposes.

FIELD OF THE INVENTION

The present invention relates generally to the field of selective catalytic reduction catalysts and to methods of preparing and using such catalysts to selectively reduce nitrogen oxides.

BACKGROUND OF THE INVENTION

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

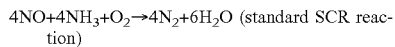
4NO+4NH$_3$+O$_2$→4N$_2$+6H$_2$O (standard SCR reaction)

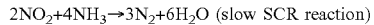
2NO$_2$+4NH$_3$→3N$_2$+6H$_2$O (slow SCR reaction)

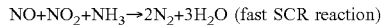
NO+NO$_2$+NH$_3$→2N$_2$+3H$_2$O (fast SCR reaction)

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Molecular sieves such as zeolites have been used in the selective catalytic reduction of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to about 10 Angstroms in diameter. Certain zeolites having 8-ring pore openings and double-six ring secondary building units, particularly those having cage-like structures, have been used as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings.

Metal-promoted zeolite catalysts also often referred to ion-exchanged zeolites or zeolites supported with iron and/or copper including, among others, iron-promoted and copper-promoted zeolite catalysts, for the selective catalytic reduction of nitrogen oxides with ammonia are known and can typically be prepared via metal ion-exchange processes. For example, iron-promoted zeolite beta has been an effective commercial catalyst for the selective reduction of nitrogen oxides with ammonia. Unfortunately, it has been found that under harsh hydrothermal conditions (e.g., as exhibited during the regeneration of a soot filter with temperatures locally exceeding 700° C.), the activity of many metal-promoted zeolites begins to decline. This decline has been attributed to dealumination of the zeolite and the consequent loss of metal-containing active centers within the zeolite.

Metal-promoted, particularly copper-promoted, aluminosilicate zeolites having the CHA structure type have solicited a high degree of interest as catalysts for the SCR of oxides of nitrogen in lean burning engines using nitrogenous reductants. These materials exhibit activity within a wide temperature window and excellent hydrothermal durability, as described in U.S. Pat. No. 7,601,662. Prior to the discovery of metal promoted zeolites described in U.S. Pat. No. 7,601,662, while a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. The invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Even though the catalysts described in U.S. Pat. No. 7,601,662 exhibit excellent properties, rendering them useful e.g., in the context of SCR catalysis, there is always a desire for improved performance in extended and/or different temperature windows. One of the challenges of meeting current governmental $NO_x$ regulations is the improvement of low temperature performance of the existing Cu-SSZ13 based SCR catalysts (for example, Euro 6). Accordingly, it would be beneficial to provide an SCR catalyst that has improved low and high temperature performance and lower $N_2O$ make versus current Cu-SSZ13-based SCR catalysts.

SUMMARY OF THE INVENTION

The present disclosure generally provides catalysts, catalytic articles and catalyst systems comprising such catalytic articles. In particular, such articles and systems comprise an SCR catalyst, which includes a combination of copper and iron co-exchanged on chabazite (CHA) zeolite material.

In one aspect of the invention, the catalyst includes a zeolite having a chabazite (CHA) crystal structure ion-exchanged with iron and copper. These newly formed zeolite supports are often referred to as metal promoted supports, in this case iron promoted supports and/or copper promoted supports. Furthermore, these metal ions are supported metal ions, e.g. supported iron and copper. Therefore, the terms "ion-exchanged" and "supported iron and/or copper" can be used interchangeably. In some embodiments, the pore size of the zeolite is about 3 to about 5 Angstroms. In another embodiment, the BET surface area of the zeolite is at least about 400 m$^2$/g.

In certain embodiments, the CHA crystal structure of the catalyst is selected from an aluminosilicate zeolite, a borosilicate, a gallosilicate, a SAPO, an ALPO, a MeAPSO, and a MeAPO. For example, the CHA crystal structure can be further selected from a group consisting of SSZ-13, SSZ-62, natural chabazite, zeolite K-G, Linde D, Linde R, LZ-218, LZ-235, LZ-236, ZK-14, SAPO-34, SAPO-4, SAPO-47, and ZYT-6.

In some embodiments, the CHA crystal structure of the catalyst is an aluminosilicate zeolite. The silica-to alumina ratio (SAR) of the aluminosilicate zeolite is about 5 to about 100, preferably about 10 to about 40, more preferably about 12 to about 35.

In some embodiments, the catalyst has a D90 particle size of about 10 to about 40 microns.

In further embodiments, the iron is present in the zeolite in an amount of from about 0.01% to about 6.0% by weight of the final metal ion-exchanged zeolite composition, preferably about 0.5% to about 4.5% by weight of the final metal ion-exchanged zeolite composition, more preferably about 1% to about 3.5% by weight of the final metal ion-exchanged zeolite composition, calculated as iron oxide (Fe$_2$O$_3$). Likewise, the copper is present in the zeolite in an amount of from about 0.01% to about 6.0% by weight of the final metal ion-exchanged zeolite composition, preferably about 0.5% to about 5% by weight of the final metal ion-exchanged zeolite composition, more preferably from about 1% to about 4% by weight of the final metal ion-exchanged zeolite composition, calculated as copper oxide (CuO).

In another aspect, the invention provides a method of making a CHA zeolite catalyst containing ion-exchanged iron and copper therein including the following steps:
a) contacting a chabazite (CHA) zeolite with a copper metal precursor and an iron metal precursor in a solution to form a solid CHA zeolite material containing iron precursor and copper ion-exchanged therein;
b) drying of the solid material to obtain a dry CHA zeolite catalyst containing iron and copper metal precursor therein; and
c) calcining the dry CHA zeolite catalyst containing catalyst containing iron and copper metal precursor to convert the catalyst into active form.

In some embodiments, the copper metal precursor described in this method is copper acetate. In another embodiment, the iron metal precursor described in this method is iron (III) nitrate. The chabazite (CHA) zeolite in this method is a Na form of chabazite zeolite and has been calcined prior to contacting the copper metal precursor and the iron metal precursor. In some embodiments, the copper metal precursor and iron metal precursor in solution is heated with the CHA zeolite at elevated temperature. In some embodiments, the solution is an aqueous solution. In another embodiment, the drying of the solid material occurs at elevated temperature. Yet, in another embodiment, the CHA zeolite catalyst containing iron and copper metal precursors is calcined at a temperature of about 500° C. to about 800° C.

Another aspect of the invention describes a catalyst article including a catalyst substrate having a plurality of channels adapted for gas flow, each channel having a wall surface in adherence to a catalytic coating comprising the catalyst composition. In some embodiments, the catalyst substrate is a honeycomb. For example, the honeycomb substrate includes a wall flow filter substrate. In another example, the honeycomb substrate includes a flow through substrate. In some embodiments, the catalytic coating is present on the substrate with a loading of at least about 1.0 g/in$^3$. In additional embodiments, the catalytic coating is present on the substrate with a loading of at least about 2.0 g/in$^3$.

Another aspect of the invention describes a method for reducing NOx level in an exhaust gas including contacting the gas with the catalyst for a time and temperature sufficient to reduce the level of NOx in the gas. In some embodiments, the NOx level in the exhaust gas is reduced to N$_2$ at a temperature between 200° C. to about 600° C. For example, the NOx level in the exhaust gas is reduced by at least 50% at 200° C. In another example, the NOx level in the exhaust gas is reduced by at least 70% at 600° C. In some embodiments, the catalyst article is a selective reduction catalyst (SCR).

Another aspect of the invention describes an exhaust gas treatment system comprising the catalyst article disposed downstream from a combustion engine and an injector that adds a reductant to an exhaust gas from the engine. In some embodiments, the engine is a diesel engine. In another embodiment, the exhaust gas treatment system further includes a diesel oxidation catalyst. Yet, a further embodiment describes the reductant in the exhaust gas treatment system to include ammonia or an ammonia precursor.

The invention includes, without limitation, the following embodiments.

Embodiment 1: A catalyst composition comprising: a zeolite having a chabazite (CHA) crystal structure ion-exchanged with iron and copper.

Embodiment 2: The catalyst composition of any preceding or subsequent embodiment, wherein said zeolite has a pore size of about 3 to about 5 Angstroms.

Embodiment 3: The catalyst composition of any preceding or subsequent embodiment, wherein the CHA crystal structure is selected from an aluminosilicate zeolite, a borosilicate, a gallosilicate, a SAPO, and ALPO, a MeAPSO, and a MeAPO.

Embodiment 4: The catalyst composition of any preceding or subsequent embodiment, wherein the CHA crystal structure is an aluminosilicate zeolite having a silica-to alumina ratio (SAR) of about 5 to about 100.

Embodiment 5: The catalyst composition of any preceding or subsequent embodiment, wherein said aluminosilicate zeolite has a silica-to alumina ratio (SAR) of about 10 to about 40.

Embodiment 6: The catalyst composition of any preceding or subsequent embodiment, wherein iron present in said zeolite in an amount of from about 0.01% to about 6.0% by weight of final metal ion-exchanged zeolite, calculated as iron oxide (Fe$_2$O$_3$).

Embodiment 7: The catalyst composition of any preceding or subsequent embodiment, wherein iron present in said zeolite in an amount of from about 0.5% to about 4.5% by weight of final metal ion-exchanged zeolite, calculated as iron oxide (Fe$_2$O$_3$).

Embodiment 8: The catalyst composition of any preceding or subsequent embodiment, wherein copper present in said zeolite in an amount of from about 0.01% to about 6.0% by weight of final metal ion-exchanged zeolite, calculated as copper oxide (CuO).

Embodiment 9: The catalyst composition of any preceding or subsequent embodiment, wherein copper present in said zeolite in an amount of from about 0.5% to about 5% by weight of final metal ion-exchanged zeolite, calculated as copper oxide (CuO).

Embodiment 10: The catalyst composition of any preceding or subsequent embodiment, wherein zeolite has a BET surface area of at least about 400 m$^2$/g.

Embodiment 11: The catalyst composition of any preceding or subsequent embodiment, having a $D_{90}$ particle size of about 10 to about 40 microns.

Embodiment 12: A method of making a CHA zeolite catalyst containing iron and copper therein comprising: a. contacting a chabazite (CHA) zeolite with a copper metal precursor and an iron metal precursor in a solution to form a CHA zeolite material containing iron and copper therein; b. drying of said solid material to obtain a CHA zeolite catalyst containing iron and copper metal precursor therein; and c. calcining the CHA zeolite catalyst containing catalyst containing iron and copper metal precursor to convert the catalyst into active form.

Embodiment 13: The method of any preceding or subsequent embodiment, wherein the copper metal precursor is a copper acetate or copper nitrate salt.

Embodiment 14: The method of any preceding or subsequent embodiment, wherein the iron metal precursor is an iron (III) nitrate or iron (II) acetate salt.

Embodiment 15: The method of any preceding or subsequent embodiment, wherein the chabazite (CHA) zeolite is a Na form of chabazite zeolite and has been calcined prior to contacting the copper metal precursor and the iron metal precursor.

Embodiment 16: The method of any preceding or subsequent embodiment, further comprising heating the copper metal precursor and iron metal precursor in solution with the CHA zeolite at elevated temperature.

Embodiment 17: The method of any preceding or subsequent embodiment, wherein the CHA zeolite catalyst containing catalyst containing iron and copper metal precursor is calcined at a temperature of about 500° C. to about 800° C.

Embodiment 18: The method of any preceding or subsequent embodiment, wherein solution is an aqueous solution.

Embodiment 19: A catalyst article comprising a catalyst substrate having a plurality of channels adapted for gas flow, each channel having a wall surface in adherence to a catalytic coating comprising the catalyst composition of any preceding or subsequent embodiment.

Embodiment 20: The catalyst article of any preceding or subsequent embodiment, wherein the catalyst substrate is a honeycomb substrate in the form of a wall flow filter substrate or a flow through substrate.

Embodiment 21: The catalyst article of any preceding or subsequent embodiment, wherein catalytic coating is present on the substrate with a loading of at least about 1.0 g/in$^3$.

Embodiment 22: A method for reducing NOx level in an exhaust gas comprising contacting the gas with a catalyst for a time and temperature sufficient to reduce the level of NOx in the gas, wherein the catalyst is a catalyst composition according to any preceding or subsequent embodiment.

Embodiment 23: The method of any preceding or subsequent embodiment, wherein said NOx level in the exhaust gas is reduced to $N_2$ at a temperature between 200° C. to about 600° C.

Embodiment 24: The method of any preceding or subsequent embodiment, wherein said NOx level in the exhaust gas is reduced by at least 50% at 200° C.

Embodiment 25: The method of any preceding or subsequent embodiment, wherein said NOx level in the exhaust gas is reduced by at least 70% at 600° C.

Embodiment 26: An emission treatment system for treatment of an exhaust gas stream, the emission treatment system comprising: (i) an engine producing an exhaust gas stream; (ii) a catalyst article according of any preceding or subsequent embodiment positioned downstream from the engine in fluid communication with the exhaust gas stream and adapted for the reduction of NOx within the exhaust stream to form a treated exhaust gas stream; and (iii) an injector adapted for the addition of a reductant to the exhaust gas stream to promote reduction of NOx to $N_2$ and water as the exhaust gas stream is exposed to the catalyst article.

Embodiment 27: The emission treatment system of any preceding or subsequent embodiment, wherein the engine is a diesel engine.

Embodiment 28: The emission treatment system of any preceding or subsequent embodiment, further comprising a diesel oxidation catalyst.

Embodiment 29: The emission treatment system of any preceding or subsequent embodiment, wherein the reductant comprises ammonia or an ammonia precursor.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1:
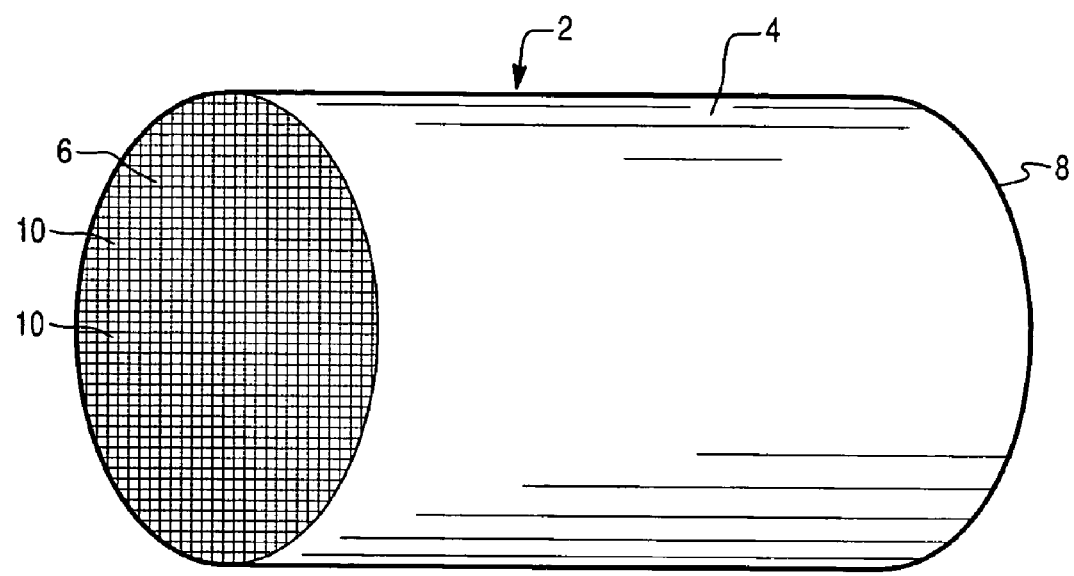
FIG. 1 is a perspective view of a honeycomb-type substrate carrier which may comprise a catalytic article (i.e., selective reduction catalyst (SCR)) washcoat composition in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention provides a selective reduction catalyst (SRC) composition suitable for at least partial conversion of gaseous NOx emissions and a reduction in $N_2O$ make. The SRC composition includes at least two metal oxide components ion-exchanged on a porous refractory oxide support that provide an effect on NOx conversion activity. The SRC composition can be prepared using metal ion-exchange processes rather than incipient wetness impregnation techniques to generate the catalyst composition, which can then be coated onto a catalyst substrate using a washcoat technique as set forth more fully below.

Ion exchange is a process commonly used for exchanging ions residing in a porous support with an outside metal ion of interest. For example, zeolites prepared with sodium ions residing in the pores can be exchanged with a different ion to form an ion-exchanged porous support. This is accomplished by preparing a slurry of the porous support, i.e., zeolite, in a solution containing the outside metal ion of interest to be exchanged. Heat may be optionally applied during this process. The outside metal ion can diffuse into the pores of the support and exchange with the residing ion, i.e., sodium, to form the metal-ion exchanged porous support.

However, unlike the ion exchange process, incipient wetness impregnation techniques, also called capillary impregnation or dry impregnation, commonly used for the synthesis of heterogeneous materials, i.e., catalysts, do not require the presence of any residing ions in the starting material. Typically, a metal precursor is dissolved in an aqueous or organic solution and then the metal-containing solution is added to a catalyst support, i.e., zeolite, containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to drive off the volatile components within the solution, depositing the metal on the catalyst surface. The maximum loading is limited by the solubility of the precursor in the solution. The concentration profile of the impregnated material depends on the mass transfer conditions within the pores during impregnation and drying.

The following terms shall have, for the purposes of this application, the respective meanings set forth below.

As used herein, the term "selective catalytic reduction" (SCR) refers to the catalytic process of reducing oxides of nitrogen to dinitrogen ($N_2$) using a nitrogenous reductant (e.g., ammonia, urea, and the like).

As used herein, the term "catalyst" or "catalyst composition" refers to a material that promotes a reaction. As used herein, the phrase "catalyst system" refers to a combination of two or more catalysts, for example a combination of a first SCR catalyst and a second SCR catalyst. The catalyst system may be in the form of a washcoat in which the two SCR catalysts are mixed together.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing slurry containing a certain solid content (e.g., 30-90% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalytic article" refers to an element that is used to promote a desired reaction. For example, a catalytic article may comprise a washcoat containing catalytic compositions on a substrate.

The term "abate" means to decrease in amount and "abatement" means a decrease in the amount, caused by any means.

As used herein, "impregnated" or "impregnation" refers to permeation of the catalytic material into the porous structure of the support material.

As used therein, the term "pseudo crystalline" refers to a substance that appears to be crystalline, even under a microscope, but does not have a true crystalline diffraction pattern.

Catalyst Composition

The SRC composition includes a combination of copper and iron ion-exchanged on a chabazite (CHA) zeolite support. In certain embodiments, the combination of copper and iron ion-exchanged on a chabazite (CHA) zeolite support is expressed as a weight ratio of the corresponding metal oxides. In some embodiments, that expressed weight ratio of copper oxide to iron oxide ranges from about 1:10 to about 10:1, more typically from about 1:3 to about 3:1. The concentrations of copper and iron components can vary, but will typically be from about 0.1 wt. % to about 12 wt. % relative to the weight of the zeolite support material (e.g., about 6 wt. % to about 8 wt. % relative to the final metal ion-exchanged zeolite support composition) calculated as the metal oxide. In some embodiments, the iron present in the zeolite is in an amount of from about 0.01% to about 6.0% by weight of the final metal-ion exchanged zeolite composition, preferably about 0.5% to about 4.5% by weight of the final metal-ion exchanged zeolite composition, more preferably about 1% to about 3.5% by weight of the final metal-ion exchanged zeolite composition, calculated as iron oxide ($Fe_2O_3$). In another embodiment the copper present in said zeolite is in an amount of from about 0.01% to about 6.0% by weight of the final metal-ion exchanged zeolite composition, preferably about 0.5% to about 5.0% by weight of the final metal-ion exchanged zeolite composition, more preferably about 1% to about 4% by weight of the final metal-ion exchanged zeolite composition, calculated as copper oxide (CuO). These newly formed zeolite supports are often referred to as metal promoted supports, in this case iron promoted supports and/or copper promoted supports. Furthermore, these metal ions are supported metal ions, e.g. supported iron and copper. Therefore, the terms "ion-exchanged" and "supported iron and/or copper" can be used interchangeably. Zeolites of the present invention are chabazite (CHA) crystal structure zeolites and selected from an aluminosilicate zeolite, a borosilicate, a gallosilicate, a SAPO, and ALPO, a MeAPSO, and a MeAPO. In some embodiments, the CHA crystal structure is an aluminosilicate zeolite. Aluminosilicate zeolites can have a crystalline or pseudo crystalline structure and may include framework metals other than aluminum (i.e., metal-substituted), such as silico-aluminophosphates (SAPOs). Natural as well as synthetic zeolites may also be used, but synthetic zeolites are preferred because these zeolites have more uniform silica-alumina ratio (SAR), crystallite size, and crystallite morphology, and have fewer and less concentrated impurities (e.g. alkaline earth metals). Specific zeolites having the CHA structure that are useful in the present invention include, but are not limited to SSZ-13, SSZ-62, natural chabazite, zeolite K-G, Linde D, Linde R, LZ-218, LZ-235, LZ-236, ZK-14, SAPO-34, SAPO-4, SAPO-47, and ZYT-6.

Zeolites being crystalline materials have rather uniform pore sizes which, depending upon the type of zeolite and the type and amount of cations included in the zeolite lattice, range from about 3 to 10 Angstroms in diameter. In one embodiment, the CHA zeolite has a pore size of about 3 to about 5 Angstroms.

The zeolite is typically present in the form of a highly crystalline material, the material being at least about 75% crystalline, at least about 80% crystalline, at least about 85% crystalline, at least about 90% crystalline, at least about 95% crystalline, at least about 98% crystalline, at least about 99% crystalline, or at least about 99.5% crystalline. The synthesis of zeolite varies according to the structure type of the molecular sieve material, but is usually synthesized using a structure directing agent (SDA), sometimes referred to as a template (or organic template) together with sources of silica and alumina. The structure directing agent can be in the form of an organic, i.e. tetraethylammonium hydroxide (TEAOH), or inorganic cation, i.e. $Na^+$ or $K^+$. During crystallization, the tetrahedral units organize around the SDA to form the desired framework, and the SDA is often embedded within the pore structure of the zeolite crystals. In one or more embodiments, the crystallization of the first and second molecular sieves can be obtained by means of the addition of structure-directing agents/templates, crystal nuclei or elements. Exemplary preparations of zeolites are described in U.S. Pat. No. 8,293,198 to Beutel et al.; U.S. Pat. No. 8,715,618 of Trukhan et al.; U.S. Pat. No. 9,162,218 of Bull et al.; and U.S. Pat. No. 8,883,119 of Bull et al., which are incorporated by reference herein in their entirety.

Zeolites generally comprise silica to alumina (SAR) molar ratios of 2 or greater. However, the ratio of silica to alumina of the molecular sieve components can vary over a wide range. In one or more embodiments, the alumina molar ratio (SAR) in the range of up to about 300, including about 5 to about 250; about 10 to about 100; about 15 to about 75; and about 20 to about 50.

Generally, molecular sieves, e.g. zeolites, are defined as aluminosilicates with open 3-dimensional framework structures composed of corner-sharing $TO_4$ tetrahedra, where T is Al or Si. Cations that balance the charge of the anionic framework are loosely associated with the framework oxygens, and the remaining pore volume is filled with water molecules. The non-framework cations are generally exchangeable, and the water molecules removable.

Zeolite support material typically exhibits a BET surface area in excess of 60 $m^2/g$, often up to about 200 $m^2/g$ or higher. "BET surface area" has its usual meaning of referring to the Brunauer, Emmett, Teller method for determining surface area by $N_2$ adsorption. In one or more embodiments the BET surface area is at least about 200 $m^2/g$, or at least about 400 $m^2/g$, or at least about 600 $m^2/g$.

The particle size of the zeolite can vary. Generally the particle size of CHA zeolite can be characterized by a D90 particle size of about 10 to about 40 microns, preferably about 10 to about 30 microns, more preferably 10 microns to about 20 microns. D90 is defined as the particle size at which 90% of the particles have a finer particle size.

In one embodiment, a Cu/Fe co-exchanged chabazite catalyst can be prepared by a one-step direct co-exchange of a calcined Na form of chabazite zeolite. The Na form zeolite should be preferably calcined prior to the exchange at the lowest practical temperature (≤540° C.) to eliminate or minimize formation of the extra-framework aluminum species and/or distorted aluminum sites. The co-exchange can be performed at 60° C. for 1 hr using copper acetate and iron (III) nitrate as metal precursors. The copper acetate can be added first, followed by the addition of the iron (III) nitrate nonahydrate. While the Fe(III) exchanges nominally at 100%, the proper amount of Cu-acetate can be pre-determined using an ion exchange isotherm. After the exchange is completed, the sample is filtered and washed using a Buchner funnel to <200 μmhos conductivity, and then dried at 85° C. in the drying oven. Copper and iron contents are analyzed using ICP and are reported as oxides on a volatile free basis (see Table 1 in example 1).

Substrate

According to one or more embodiments, the substrate for the catalyst article composition (i.e., SRC catalyst composition) may be constructed of any material typically used for preparing automotive catalysts and will typically comprise a metal or ceramic honeycomb structure. The substrate typically provides a plurality of wall surfaces upon which the catalyst article (i.e., SRC catalyst) washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst article (i.e. SCR catalyst) composition can permeate into the pore structure of the porous walls (i.e., partially or fully occluding the pore openings) in addition to being disposed on the surface of the walls.

Figure 2:
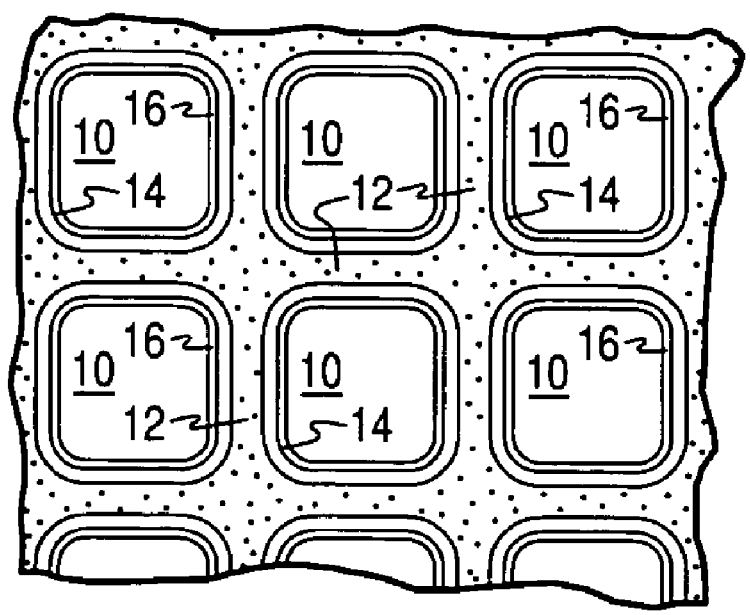
FIG. 2 is a partial cross-sectional view enlarged relative to FIG. 1 and taken along a plane parallel to the end faces of the substrate carrier of FIG. 1 representing a monolithic flow-through substrate, which shows an enlarged view of a plurality of the gas flow passages shown in FIG. 1.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
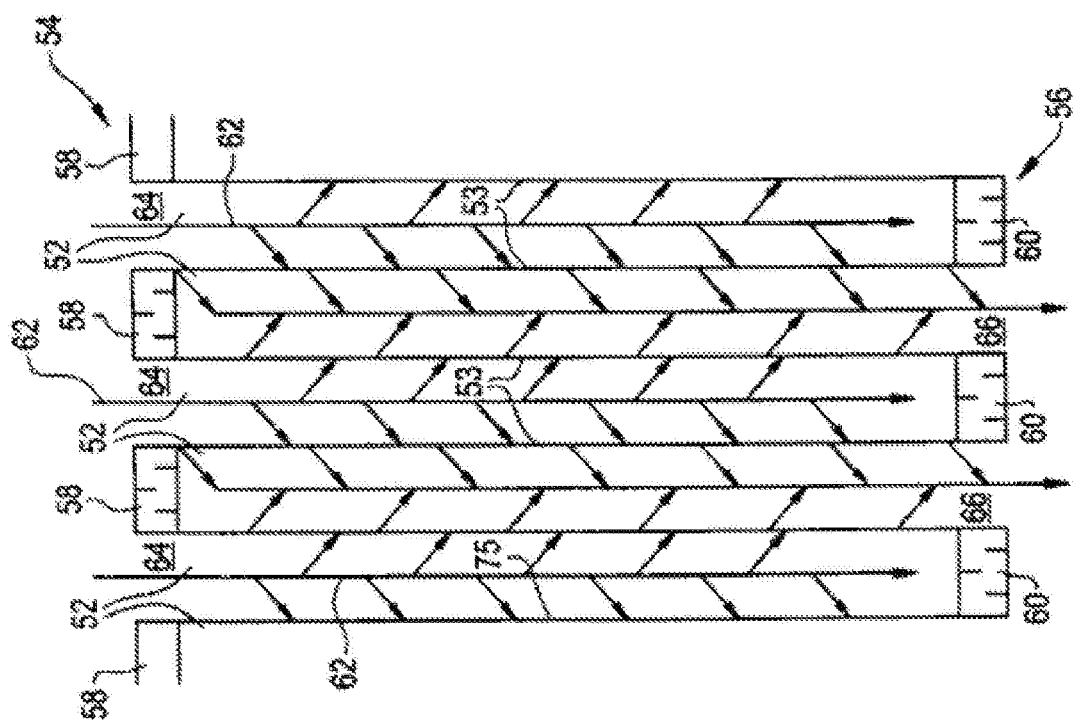
FIG. 3 is a cutaway view of a section enlarged relative to FIG. 1, wherein the honeycomb-type substrate carrier in FIG. 1 represents a wall flow filter substrate monolith.

Alternatively, FIGS. 1 and 3 can illustrate an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the catalytic article (i.e., both ion-exchanged metals on zeolite support material) on the catalyst substrate, such as a monolithic flow-through substrate, is typically from about 0.5 to about 6 g/in$^3$, and more typically from about 1 to about 5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Method of Making the Catalyst Composition

Preparation of the metal ion-exchanged zeolite material typically comprises an ion-exchange process of the zeolite support material in particulate form with a metal precursor solution. Multiple metal precursors (e.g., copper and iron) are ion-exchanged at the same time or separately, are ion-exchanged using the same external solution, and are ion-exchanged on the same support particles. For example, CHA zeolite particles are used as support particles.

Multiple metal precursors are added separately when an ion exchange isotherm of the first metal precursor has to be determined prior to the addition of the second metal precursor. The ion exchange isotherm describes the concentration of the first metal ion precursor as a function of its concentration in the external solution at any given temperature and pressure. Complete co-exchange of the first metal precursor ion with the ions residing in the support material is achieved when the ion concentration of the first metal precursor is at an effective concentration in the external solution to promote complete such ion exchange at a given temperature and pressure. After completion of the co-exchange of the ions of the first metal precursor, the second metal precursor is added to the same external solution to allow for co-exchange of the ions of the second metal precursor.

The support particles are usually sufficiently dry to absorb substantially all of the solution to form a moist solid. For example, a Na form of chabazite zeolite can be calcined to afford dry Na-chabazite zeolite prior to contact with the precursor metals. Aqueous solutions of water soluble compounds or complexes of the metal precursors are typically utilized, such as nitrate or acetate salts of the metal precursors with specific examples including copper (II) nitrate, copper (II) acetate, iron (II) acetate, iron (III) nitrate, and iron (III) acetate.

Following treatment of the support particles with the solution of the metal precursors, the particles are dried, such as by heat treating the particles at elevated temperature (e.g., 100-150° C.) for a period of time (e.g., 1-3 hours), and then calcining to convert the metal components to a more catalytically active oxide form. An exemplary calcination process involves heat treatment in air at a temperature of about 500-800° C. for about 1-3 hours. The above process can be repeated as needed to reach the desired level of metal precursor impregnation. The resulting material can be stored as a dry powder or in slurry form.

Substrate Coating Process

The above-noted catalyst composition, in the form of carrier particles containing a combination of metal components ion-exchanged therein, is mixed with water to form a slurry for purposes of coating a catalyst substrate, such as a honeycomb-type substrate. In addition to the catalyst particles, the slurry may optionally contain alumina as a binder, water-soluble or water-dispersible stabilizers (e.g., barium acetate), promoters (e.g., lanthanum nitrate), associative thickeners, and/or surfactants (including anionic, cationic, non-ionic or amphoteric surfactants).

When present, the alumina binder is typically used in an amount of about 0.05 $g/in^3$ to about 1 $g/in^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 10 to about 40 microns, preferably 10 to about 30 microns, more preferably about 10 to about 15 microns. The D90 is defined as the particle size at which 90% of the particles have a finer particle size.

The slurry is then coated on the catalyst substrate using a washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The catalyst composition can be applied as a single layer or in multiple layers. In one embodiment, the catalyst is applied in a single layer (e.g., only layer 14 of FIG. 2). In another embodiment, the catalyst composition is applied in multiple layers (e.g., layers 14 and 16 of FIG. 2).

Emission Treatment System

The present invention also provides an emission treatment system that incorporates the SRC catalyst composition (i.e., catalytic article) described herein. The SRC catalyst composition of the present invention is typically used in an integrated emissions treatment system comprising one or more additional components for the treatment of exhaust gas emissions, e.g., exhaust gas emissions from a diesel engine. For example, the emission treatment system may further comprise a catalyzed soot filter (CSF) component and/or a selective diesel oxidation (DOC) catalytic article. The SRC catalyst of the invention is typically located upstream or downstream from the soot filter and downstream from the diesel oxidation catalyst component, although the relative placement of the various components of the emission treatment system can be varied. The treatment system includes further components, such as reductant injectors for ammonia precursors, and may optionally include any additional particulate filtration components, $NO_x$ storage and/or trapping components. The preceding list of components is merely illustrative and should not be taken as limiting the scope of the invention.

The CSF may comprise a substrate coated with a washcoat layer containing one or more catalysts for burning trapped soot and or oxidizing exhaust gas stream emissions. In general, the soot burning catalyst can be any known catalyst for combustion of soot. For example, the CSF can be catalyzed with one or more high surface area refractory oxides (e.g., an alumina or a zirconia oxide) and/or an oxidation catalyst (e.g., a ceria-zirconia) for the combustion of unburned hydrocarbons and to some degree particulate matter. The soot burning catalyst can be an oxidation catalyst comprising one or more precious metal catalysts (e.g., platinum, palladium, and/or rhodium). In some embodiments, the CSF may comprise a substrate coated with a washcoat layer containing one or more catalysts for reducing NOx in the exhaust gas stream emissions. For example, the CSF can be catalyzed with one or more selective reduction catalysts for the conversion of NOx in the exhaust gas stream in addition to containing one or more layers containing one or more catalysts for burning trapped soot and or oxidizing exhaust gas stream emissions.

Figure 4:
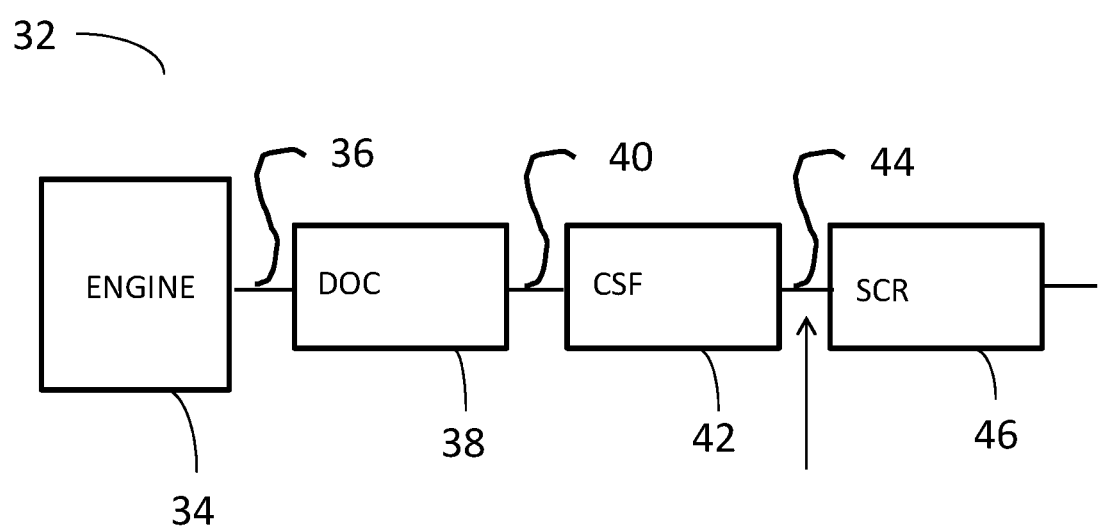
FIG. 4 shows a schematic depiction of an embodiment of an emission treatment system in which an SCR of the present invention is utilized.

One exemplary emissions treatment system is illustrated in FIG. 4, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38 to a catalyzed soot filter (CSF) to a selective reductive catalyst (SRC), which is coated with the washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the NO component may be oxidized to $NO_2$ in the DOC.

The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration. The CSF 42 can optionally include a SRC composition for the conversion of NOx present in the exhaust gas.

After removal of particulate matter, via CSF 42, the exhaust gas stream is conveyed via exhaust pipe 44 to a downstream selective catalytic reduction (SCR) component 46 of the invention for the further treatment and/or conversion of $NO_x$. The exhaust gas passes through the SCR component 46 at a flow rate which allows sufficient time for the catalyst composition to reduce the level of NOx in the exhaust gas at a given temperature. The SCR component 46 may optionally be included in the emission treatment system when CSF 42 already includes an SRC composition. An injector 50 for introducing a nitrogenous reducing agent into the exhaust stream is located upstream of the SRC 46. In some embodiments, the injector 50 may also be introduced upstream of the CSF 42 provided that the CSF 42 includes an SCR composition. The introduced nitrogenous reducing agent into the gas exhaust stream promotes the reduction of the NOx to $N_2$ and water as the gas is exposed to the catalyst composition.

With respect to this SCR process, provided herein is a method for the reduction of $NO_x$ in an exhaust gas, which comprises contacting the exhaust gas with the catalyst composition described herein and optionally in the presence of a reductant for a time and temperature sufficient to catalytically reduce $NO_x$ thereby lowering the concentration of $NO_x$ in the exhaust gas. In certain embodiments, the temperature range is from about 200° C. to about 600° C. For example, at a temperature of 200° C. the catalyst composition of the invention reduces the level of NOx in the exhaust gas by at least about 50%. Likewise, at a temperature of 600° C. the catalyst composition of the invention reduces the level of NOx in the exhaust gas by at least about 70%. The amount of NOx reduction is dependent upon the contact time of the exhaust gas stream with the catalyst, and thus is dependent upon the space velocity. The contact time and space velocity is not particularly limited in the present invention. However, the present catalyst composition of the invention has shown increased NOx reduction compared to commercial reference SCR catalysts. As such, the catalyst composition can perform, well even at high space velocity, which is desirable in certain applications.

A nitrogenous reducing agent may be introduced into the exhaust gas prior to contacting the SRC catalyst for the treatment of NOx. In general, this reducing agent for SCR processes broadly means any compound that promotes the reduction of NOx in an exhaust gas. Examples of such reductants include ammonia, hydrazine or any suitable ammonia precursor such as urea (($NH_2$)$_2$CO), ammonium carbonate, ammonium carbamate, ammonium hydrogen carbonate or ammonium formate. In one embodiment, the nitrogenous reducing agent is added using a reductant injector, which adds ammonia precursor to the gas exhaust stream upstream of the SRC 46. The presence of ammonia or the ammonia precursor in the gas exhaust stream promotes the reduction of the NOx to $N_2$ and water as the gas is exposed to the catalyst composition.

EXAMPLES

Aspects of the present invention are more fully illustrated by the following examples, which are set forth to illustrate certain aspects of the present invention and are not to be construed as limiting thereof.

The following examples are directed towards Cu/Fe co-exchanged chabazite (CHA) catalysts intended for use in diesel NOx abatement applications—the examples provide a method of preparation and illustrate improved high temperature SCR performance obtained on coated cores with nominal loading (dry gain) of 2.1 g/in$^3$.

Example 1: Preparation of the SCR Catalyst

Dry Na-chabazite zeolite was prepared by calcinating Na-chabazite zeolite at the lowest practical temperature (≤540° C.) to eliminate or minimize formation of the extra-framework aluminum species and/or distorted aluminum sites to afford dry calcined Na-chabazite zeolite. The calcined Na-chabazite zeolite was placed in a reaction vessel, followed by the addition of deionized water, and copper acetate, while mixing. Iron (III) nitrate nonahydrate was added last. The reaction mixture was heated to 60° C. for about 1 hour. Exchange of iron (III) nitrate with the sodium ions present in the zeolite occurred with 100% conversion. The amount of copper acetate was pre-determined using an ion exchange isotherm. After the ion exchange was complete, the sample was filtered and washed using a Buchner funnel to <200 μmhos conductivity, and then dried at 85° C. in the drying oven. Copper and iron contents of the zeolite material were analyzed using ICP and are reported as oxides on a volatile free basis (see Table 1).

For the preparation of Catalyst 3 in Table 1, the following procedure including amounts of reagents was used:

110 g of calcined Na-chabazite zeolite was placed in a reaction vessel, followed by the addition of deionized water, and copper acetate (10.4 g), while mixing. Iron (III) nitrate nonahydrate (2.75 g) was added last. The reaction mixture was heated to 60° C. for about 1 hour. The reaction mixture was allowed to cool down prior to filtering through a Buchner funnel, which was attached to a 4 L volumetric flask. The collected solid was washed with deionized water (about 5.5. liters) until <200 μmhos was achieved by the catalyst. The collected solid sample was dried at 85° C. in the drying oven overnight to obtain 1-2 g of dried catalyst sample 3. When submitted for chemical analysis the sample contained CuO (VF), $Fe_2O_3$ (VF), wherein CuO=3.1% and $F_2O_3$=0.46% volatile free (VF).

Co-exchanged samples of the zeolite material were coated next on cores. A slurry was prepared by mixing Cu/Fe co-exchanged Chabazite (1 part in grams) with deionized water (1.5 part in grams). Zirconium acetate was added to the slurry as a solution in the amount of 5% by wt. of the Cu/Fe co-exchanged Chabazite amount already present in the slurry. The slurry was shear mixed at 2500 rpm for 30 minutes. Octanol (1-2 drops) may be added to defoam the stirring slurry.

The slurry was coated onto 13×13×3 in$^3$ cellular ceramic cores, having a cell density of 400 cpsi (cells per square inch) and a wall thickness of 6 mil. The cores were dip coated and dried at 130° C. for 4 minutes and coated again if needed to obtain a washcoat loading of 2.1 g/in$^3$ and calcined at 450° C. for 1 hour.

Example 2: Evaluation of a Cu/Fe Co-Exchanged Chabazite (CHA) Catalyst as an SCR Catalyst for Decreasing Diesel NOx Nitrogen oxides selective catalytic reduction (SCR) efficiency of a fresh catalyst core was measured by adding a feed gas mixture of 500 ppm of NO, 500 ppm of NH$_3$, 10% O$_2$ (by volume), 5% H$_2$O (by volume), balance N$_2$ to a steady state reactor containing a core of Example 1.

For the catalytic test, the washcoated cores (dimensions: 3 inches long X ¾ inches wide X ¾ inches high) were wrapped with a ceramic insulation mat and placed inside an Inconel reactor tube heated by an electrical furnace. The gases, O$_2$ (from air), N$_2$ and H$_2$O were preheated in a preheater furnace before entering the reactor. The reactive gases NO and NH$_3$ were introduced between the preheater furnace and the reactor.

The reaction was carried at a space velocity of 80,000$^{-1}$ across a 200° C. to 600° C. temperature range. Space velocity is defined as the gas flow rate comprising the entire reaction mixture divided by the geometric volume of the catalyst core. These conditions define the standard test for fresh catalysts.

Results are summarized in Table 1. For the inventive examples, minimal changes of NOx conversion at 200° C. were detected as the amount of iron oxide loading increased in the SCR composition (e.g., Catalyst 2 versus Catalyst 4). Interestingly, at 600° C. NOx conversion improved upon increase of iron oxide loading by about 10% compared to the commercial reference material (e.g., commercial reference versus Catalyst 4). Likewise, an increase of total metal loading of the SRC composition also exhibited and increase in the amount of NOx conversion at 600° C.

TABLE 1

| Catalyst | Exchange metal loading - as oxides (%) | | NOx conversion (%) | |
|---|---|---|---|---|
| | CuO | Fe2O3 | 200° C. | 600° C. |
| Commercial Reference | 3.0 | — | 64 | 70 |
| 1 | 2.6 | 0.45 | 59 | 72 |
| 2 | 2.9 | 0.44 | 64 | 74 |
| 3 | 3.1 | 0.46 | 62 | 74 |
| 4 | 3.2 | 1.04 | 59 | 77 |

What is claimed:

1. A catalyst composition comprising:
    a zeolite having a chabazite (CHA) crystal structure ion co-exchanged with iron and copper, wherein the zeolite has a pore size of about 3 to about 5 Angstroms, wherein the iron is present in said zeolite in an amount of from about 0.5% to about 4.5% by weight of the final metal ion co-exchanged zeolite, calculated as iron oxide, Fe$_2$O$_3$, and wherein the copper is present in said zeolite in an amount of from about 0.5% to about 5% by weight of the final metal ion co-exchanged zeolite, calculated as copper oxide, CuO; and wherein a weight ratio of CuO:Fe$_2$O$_3$ ranges from 3.2:1.04 to 3.1:0.46.

2. The catalyst composition of claim 1, wherein the CHA crystal structure is selected from an aluminosilicate zeolite, a borosilicate, a gallosilicate, an ALPO, a MeAPSO, and a MeAPO.

3. The catalyst composition of claim 2, wherein the CHA crystal structure is an aluminosilicate zeolite having a silica-to alumina ratio (SAR) of about 5 to about 100.

4. The catalyst composition of claim 3, wherein said aluminosilicate zeolite has a silica-to alumina ratio (SAR) of about 10 to about 40.

5. The catalyst composition of claim 1, wherein zeolite has a BET surface area of at least about 400 m$^2$/g.

6. The catalyst composition of claim 1, having a D$_{90}$ particle size of about 10 to about 40 microns.

7. A method of making a CHA zeolite catalyst containing iron and copper therein comprising:
    a. ion co-exchanging a chabazite (CHA) zeolite with a copper metal precursor and an iron metal precursor in a solution to form a solid CHA zeolite material containing iron and copper therein;
    b. drying of said solid material to obtain a CHA zeolite catalyst containing iron and copper metal precursor therein; and
    c. calcining the CHA zeolite catalyst containing iron and copper metal precursor to convert the catalyst into active form; wherein the active form has an amount of iron, calculated as iron oxide, Fe$_2$O$_3$, and an amount of copper, calculated as copper oxide, CuO, and a weight ratio of CuO:Fe$_2$O$_3$ ranging from 3.2:1.04 to 3.1:0.46.

8. The method of claim 7, wherein the copper metal precursor is a copper acetate or copper nitrate salt.

9. The method of claim 7, wherein the iron metal precursor is an iron (III) nitrate or iron (II) acetate salt.

10. The method of claim 7, wherein the chabazite (CHA) zeolite is a Na form of chabazite zeolite and has been calcined prior to contacting the copper metal precursor and the iron metal precursor.

11. The method of claim 7, further comprising heating the copper metal precursor and iron metal precursor in solution with the CHA zeolite at elevated temperature.

12. The method of claim 7, wherein the CHA zeolite catalyst containing ion co-exchanged iron and copper metal is calcined at a temperature of about 500° C. to about 800° C.

13. The method of claim 7, wherein solution is an aqueous solution.

14. The method of claim 7, wherein the CHA zeolite catalyst has a pore size of about 3 to about 5 Angstroms, wherein the iron is present in the CHA zeolite catalyst in an amount of from about 0.5% to about 4.5% by weight of the CHA zeolite catalyst, calculated as iron oxide, Fe$_2$O$_3$, and wherein the copper is present in the CHA zeolite catalyst in an amount of from about 0.5% to about 5% by weight of the CHA zeolite catalyst, calculated as copper oxide, CuO.

15. The method of claim 7, wherein the chabazite (CHA) zeolite is selected from an aluminosilicate zeolite, a borosilicate, a gallosilicate, an ALPO, a MeAPSO, and a MeAPO.

16. A catalyst article comprising a catalyst substrate having a plurality of channels adapted for gas flow, each channel having a wall surface in adherence to a catalytic coating comprising the catalyst composition according to claim 1.

17. The catalyst article of claim 16, wherein the catalyst substrate is a honeycomb substrate in the form of a wall flow filter substrate or a flow through substrate.

18. The catalyst article of claim 16, wherein catalytic coating is present on the substrate with a loading of at least about 1.0 g/in$^3$.

19. A method for reducing NOx level in an exhaust gas comprising contacting the gas with a catalyst for a time and temperature sufficient to reduce the level of NOx in the gas, wherein the catalyst is a catalyst composition according to claim 1.

20. The method of claim 19, wherein said NOx level in the exhaust gas is reduced to $N_2$ at a temperature between 200° C. to about 600° C.

21. The method of claim 19, wherein said NOx level in the exhaust gas is reduced by at least 50% at 200° C.

22. The method of claim 19, wherein said NOx level in the exhaust gas is reduced by at least 70% at 600° C.

23. An emission treatment system for treatment of an exhaust gas stream, the emission treatment system comprising:
   i.) an engine producing an exhaust gas stream;
   ii.) a catalyst article comprising the catalyst composition according to claim 1; wherein the catalyst article is positioned downstream from the engine in fluid communication with the exhaust gas stream and adapted for the reduction of NOx within the exhaust stream to form a treated exhaust gas stream; and
   iii.) an injector adapted for the addition of a reductant to the exhaust gas stream to promote reduction of NOx to $N_2$ and water as the exhaust gas stream is exposed to the catalyst article.

24. The emission treatment system of claim 23, wherein the engine is a diesel engine.

25. The emission treatment system of claim 23, further comprising a diesel oxidation catalyst.

26. The emission treatment system of claim 23, wherein the reductant comprises ammonia or an ammonia precursor.

* * * * *